United States Patent [19]

Harmes et al.

[11] 4,291,812
[45] Sep. 29, 1981

[54] PALLET STORAGE RACK ATTACHMENT

[75] Inventors: O. Burton Harmes; Duane F. McGregor, both of Algona, Iowa

[73] Assignee: Algona Food Engineering Company, Algona, Iowa

[21] Appl. No.: 78,243

[22] Filed: Sep. 24, 1979

[51] Int. Cl.³ .............................................. A47F 5/00
[52] U.S. Cl. .................................. 211/207; 211/182; 403/49; 403/234
[58] Field of Search ............... 211/207, 182, 186, 189, 211/190, 191, 193; 403/234, 49, 256, 233, 232.1, 262; 248/72, 316 C, 228

[56] References Cited

U.S. PATENT DOCUMENTS

| 966,906 | 8/1910 | Grannis | 248/228 |
|---|---|---|---|
| 2,664,113 | 12/1953 | Dodge | 403/230 X |
| 2,678,786 | 5/1954 | Kindorf | 248/72 |
| 3,365,073 | 1/1968 | Degener | 211/182 X |
| 3,465,995 | 9/1969 | Whitman | 248/72 X |
| 4,065,089 | 12/1977 | Frazier et al. | 211/193 X |

Primary Examiner—Roy D. Frazier
Assistant Examiner—Robert W. Gibson, Jr.
Attorney, Agent, or Firm—Williamson, Bains, Moore & Hansen

[57] ABSTRACT

A horizontal, support rack for use in supporting pallets on vertical H-beams includes an elongate support bar having beam engaging clamps at opposite ends thereof. The clamps include J-shaped plates welded to the ends of the support bar, each J-shaped plate cooperating with a clamping element to adjustably secure an end of the horizontal support bar to the adjacent vertical beam. Conventional pallets are supported on adjacent pairs of horizontal support racks or bars.

2 Claims, 3 Drawing Figures

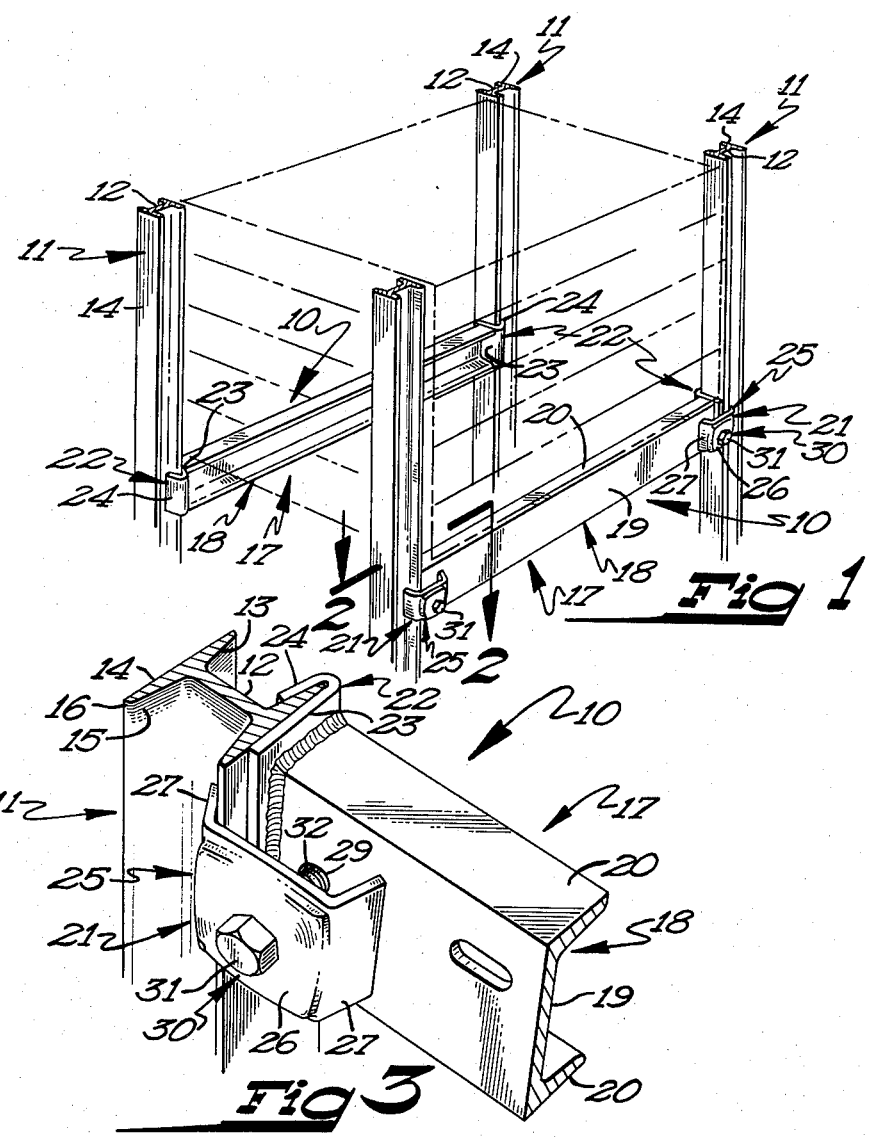
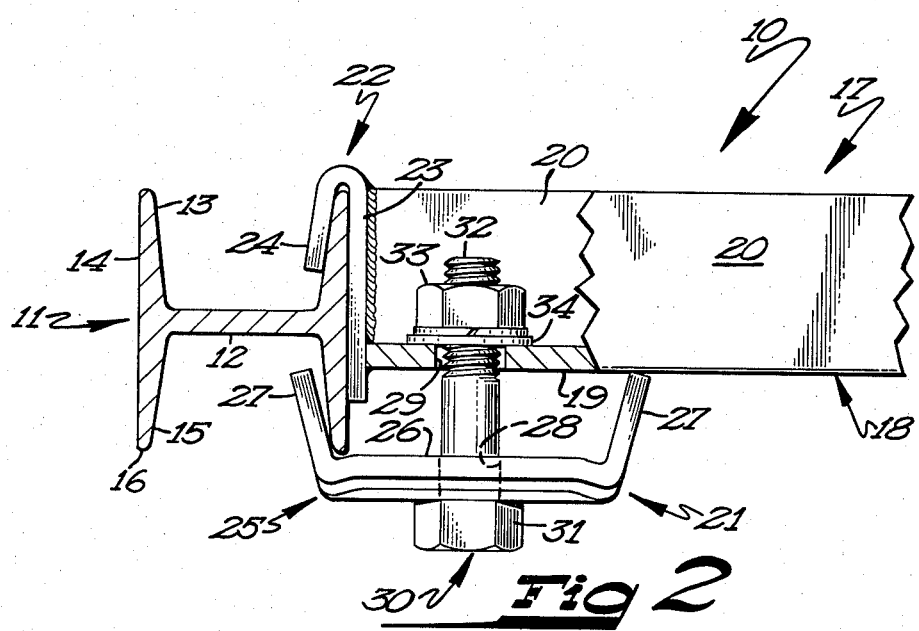

4,291,812

PALLET STORAGE RACK ATTACHMENT

SUMMARY OF THE INVENTION

This invention relates to support structures and more particularly to horizontal support racks used in supporting pallets.

Pallets are typically supported on horizontal bars or racks which are adjustably secured to vertical beams. J-bolts are used in clamping the horizontal bars to the vertical beams. The J-bolts must be pre-torqued and these J-bolts serve as the sole means of supporting the horizontal bars on the beams. It will be appreciated that when a J-bolt fails, the entire end of the horizontal support bar will then be unsupported and will collapse under the pallet load.

It is therefore a general object of this invention to provide a horizontal support rack, used in supporting pallets, with the novel means of adjustably clamping the horizontal support rack to the associated vertical beams.

Another object of this invention is to provide a horizontal pallet supporting rack with a novel clamp, of simple and inexpensive construction, for effectively and safely securing the ends of the rack to a support beam.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a perspective view illustrating a plurality of horizontal support racks secured to vertical support beams and supporting pallets in stacked relation;

FIG. 2 is a cross-sectional view taken approximately along line 2—2 of FIG. 1 and looking in the direction of the arrows; and FIG. 3 is a fragmentary perspective view illustrating my novel clamp device.

DESCRIPTION OF THE PREFERRED EMBODIMENT OF THE INVENTION

Referring now to the drawings and more particularly to FIG. 1, it will be seen that a support apparatus designated generally by the reference numeral 10 is there-shown. The support apparatus includes a plurality of spaced apart vertical H-beams 11 each including a web 12 having a pair of substantially parallel flanges 13 integral therewith. It will be seen that each of the flanges 13 has a substantially flat outer surface 14, slightly inclined inner surfaces 15 and end edges 16.

The support apparatus also includes a plurality of horizontal support devices or racks 17 each being secured to a pair of the vertical beams 11, and adjacent pairs of the horizontal support racks serving to support one or more pallets P thereon. Each of the horizontal racks 17 includes a channel shaped horizontal support member or bar 18 each having a central web 19 and upper and lower parallel flanges 20 integrally formed therewith.

Each of the horizontal support bars 18 are provided with novel connecting means 21 at each end thereof, each connecting means including a J-shaped clamping member 22 rigidly affixed to each end of the associated horizontal support bar. Each J-shaped clamping member 22 includes a substantially flat plate portion 23 which is rigidly affixed to the end of the associated support bar 18 by welding. Each J-shaped clamping member 22 also includes a bent end portion 24 which diverges slightly from the associated plate portion 23. It will be seen that when the horizontal support members are secured to the vertical beams, the plate portion 23 of each J-shaped clamping member is positioned in abutting relation with respect to the flat outer surface 14 of the flange of the associated vertical beams. The end portion 24 of each clamping member 22 extends around an end portion of one of the flanges 13 of the vertical beam and engages the inner surface 15 thereof.

The clamping means on each end of the horizontal support bars also include a generally U-shaped element 25 including a substantially flat intermediate portion 26 having offset end portions 27. The clamping element 25 has a centrally located opening 28 in the intermediate thereof. When the clamping means is applied to the associated vertical beam, the opening 28 is disposed in registering relation with a similar opening 29 located in the web 19 of the horizontal support bar 18. A bolt 30 projects through the opening 28 and 29 and is provided with a head 31 and a threaded shank 32. A nut 33 and a washer 34 secure the bolt to the clamping element 25 and the horizontal support bar 18 and releasably and adjustably secures the horizontal support bar to the associated vertical beam.

It will be seen that when one of the horizontal support bars is connected to the associated vertical beams, the snug surface contact of the plate portion 23 of the J-shaped clamping member with the flange 13 of the beam 11 will permit only a slight downward displacement of the end of the horizontal support bar in the event that the bolt 30 fails. In this regard, in the event that the bolt does fail, it has been found that the end portion of the horizontal support bar will slide downwardly only approximately one-half inch before the plate portion 23 binds with the associated flange 13 of the vertical beam.

It will further be appreciated that the present system permits the use of conventional bolts which are not required to be pre-torqued in the manner of the J-bolts which are now typically used on horizontal pallet support racks.

Thus, it will be seen that we have provided a novel support rack device for use in supporting pallets, which is not only of simple and inexpensive construction, but one which functions in a more efficient and safe manner than comparable devices.

It is anticipated that various changes can be made in the size, shape and construction of the pallet device disclosed herein without departing from the spirit and scope of the invention as defined in the following claims.

What is claimed is:

1. A support device for use in supporting pallets on vertical H-beams, each beam including a central web having flanges integral with each end thereof, said support device including an elongate straight support member having a pair of openings therein, each opening being located adjacent but spaced from one end of said support member, clamping means on each end of said support member to releasably engage the adjacent vertical H-beam, each of said clamping means including a J-shaped clamping member rigidly affixed to one end of said support member for encompassing and engaging an edge portion of the adjacent flange of the associated vertical H-beam, a pair of clamping elements each engaging the other edge portion of the flange of the adjacent vertical H-beam, each clamping element having an opening therein diposed in registering relation with an opening in the support member, and nut and bolt assembly adjustably and releasably clamping a portion of each of said clamping elements against the flange of the adjacent H-beam and against said horizontal support member to releasably and adjustably support the end of the horizontal support member on the associated vertical H-beam.

2. A support device for use in supporting pallets on vertical H-beams, each beam including a central web having flanges integral with each end thereof, said support device including an elongate straight support member, clamping means on each end of said support member to releasably engage the adjacent vertical beam, each of said clamping means comprising a J-shaped clamping member including plate portion rigidly affixed to one end of said support member and disposed in contacting with flange of the associated beam, said clamping member encompassing and engaging an edge portion of the adjacent flange of the associated vertical beam, a generally U-shaped adjustably and releasably securing said clamping elements with said horizontal support bar to releasably and adjustably support the end of the horizontal support bar on the associated vertical beam.

* * * * *